US012762655B2

(12) United States Patent
Kadu et al.

(10) Patent No.: US 12,762,655 B2
(45) Date of Patent: Oct. 13, 2026

(54) AUTOMATED VERIFICATION OF STATIC AND DYNAMIC GRAPHIC OBJECTS

(71) Applicant: Honeywell International Inc., Charlotte, NC (US)

(72) Inventors: Roshan Kadu, Akola (IN); Prem Kumar, Bangalore (IN); Abdur Rab, Bangalore (IN); Balasubramanyam Ravindranath, Bangalore (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 266 days.

(21) Appl. No.: 18/598,894

(22) Filed: Mar. 7, 2024

(65) Prior Publication Data

US 2025/0217931 A1 Jul. 3, 2025

(30) Foreign Application Priority Data

Jan. 3, 2024 (IN) ............................ 202411000380

(51) Int. Cl.

*G06T 5/50* (2006.01)
*G06F 3/04883* (2022.01)
*G06V 10/75* (2022.01)

(52) U.S. Cl.

CPC ............ *G06T 5/50* (2013.01); *G06F 3/04883* (2013.01); *G06V 10/751* (2022.01); *G06T 2207/20221* (2013.01)

(58) Field of Classification Search

CPC ............. G06T 5/50; G06T 2207/20221; G06F 3/04883; G06V 10/751

See application file for complete search history.

(56) References Cited

U.S. PATENT DOCUMENTS

| | | | |
|---|---|---|---|
| 7,342,512 B2 | 3/2008 | Hedrick | |
| 9,332,252 B2 | 5/2016 | Silva | |
| 11,221,932 B2 * | 1/2022 | Viggers | G06T 7/0002 |
| 2009/0172559 A1 | 7/2009 | Waldman et al. | |

(Continued)

FOREIGN PATENT DOCUMENTS

| | | |
|---|---|---|
| CN | 110308346 A | 10/2019 |
| CN | 111966575 A | 11/2020 |

(Continued)

OTHER PUBLICATIONS

Mandl et al., "Using Social Media and Mobile Devices to Discover and Share Disaster Data Products Derived From Satellites" as downloaded from nasa.gov no later than Mar. 7, 2024.

(Continued)

*Primary Examiner* — Tammy Paige Goddard

(74) *Attorney, Agent, or Firm* — Fogg & Powers LLC

(57) ABSTRACT

Systems and methods for automatic verification of static and dynamic graphic objects rendered by a graphic engine are provided. In certain embodiments, a method includes receiving a signal from the graphic engine indicating that a triggering event has occurred. For each triggering event, the method includes copying data that includes at least one graphic object from a frame buffer to a test buffer; calculating a timing value for the at least one graphic object; overlaying the timing value on the at least one graphic object; and comparing the at least one graphic object with an expected graphic object.

19 Claims, 6 Drawing Sheets

(56) References Cited

U.S. PATENT DOCUMENTS

| | | | |
|---|---|---|---|
| 2011/0276946 A1 | 11/2011 | Pletter | |
| 2018/0296912 A1 | 10/2018 | Hicks et al. | |
| 2019/0286115 A1 | 9/2019 | Wang | |
| 2020/0098165 A1* | 3/2020 | Gruber | G06T 15/005 |
| 2020/0159647 A1* | 5/2020 | Puszkiewicz | G06F 18/241 |

FOREIGN PATENT DOCUMENTS

| | | |
|---|---|---|
| CN | 113626311 A | 11/2021 |
| CN | 114987796 A | 9/2022 |
| KR | 101867862 B1 | 6/2018 |

OTHER PUBLICATIONS

RTCA Inc., “Software Considerations in Airborne Systems and Equipment Certification”, RTCA DO-178C, Provided by Accuris under license with RTCA, Inc., Dec. 13, 2011, pp. Cover through B-10.

RTCA, Inc., “Supporting Information for DO-178C and DO-278A”, Provided by Accuris under license with RTCA, Inc., Dec. 13, 2011, Pages Cover through D-4.

Wikipedia, “Primary flight display” Retrieved May 22, 2023 from “https://en.wikipedia.org/w/index.php?title=Primary_flight_display&oldid=1112567071”, pp. 1 through 3.

European Patent Office, “Extended European Search Report”, dated May 7, 2025, from EP Application No. 24218589.0 from Foreign Counterpart to U.S. Appl. No. 18/598,894, pp. 1 through 11, Published: EP.

* cited by examiner

AUTOMATED VERIFICATION OF STATIC AND DYNAMIC GRAPHIC OBJECTS

CROSS-REFERENCE TO RELATED APPLICATIONS

This application claims the benefit of Indian Provisional No. 202411000380, filed on Jan. 3, 2024, titled "AUTOMATED VERIFICATION OF STATIC AND DYNAMIC GRAPHIC OBJECTS," which is hereby incorporated herein by reference in its entirety.

BACKGROUND

Display systems often include widgets and graphic objects with which users view and interact. Some applications are subject to standards that require the verification of the appearance and function of the widgets and graphic objects to ensure that the display system functions as designed. As these displays are visual, verification is typically performed through visual inspection and interaction by a user, such as a test engineer. In particular, the verification process may call for a test engineer to verify that each widget and graphic object rendered on the display is drawn/rendered as intended. Test engineers must focus on fonts, colors, content, and other aspects of the rendered graphic objects when performing the verification process. Visual inspection of the graphic objects and determining that the objects have been rendered correctly is often time-consuming, error-prone, and stressful. Additionally, test engineers must be physically present in front of a display showing the rendered objects when verifying the rendering of the objects, which may be an inefficient use of computation resources. Additionally, changes to the graphic content may prompt the repetition of verification processes.

SUMMARY

Systems and methods for automatic verification of static and dynamic graphic objects rendered by a graphic engine are provided. In certain embodiments, a method includes receiving a signal from the graphic engine indicating that a triggering event has occurred. For each triggering event, the method includes copying data that includes at least one graphic object from a frame buffer to a test buffer; calculating a timing value for the at least one graphic object; overlaying the timing value on the at least one graphic object; and comparing the at least one graphic object with an expected graphic object.

BRIEF DESCRIPTION OF DRAWINGS

Drawings accompany this description and depict only some embodiments associated with the scope of the appended claims. Thus, the described and depicted embodiments should not be considered limiting in scope. The below specification and accompanying drawings describe exemplary embodiments and features thereof, with additional specificity and detail, in which:

FIG. 1 is a block diagram of a system for verification of graphic objects according to an aspect of the present disclosure;

Figure 1:
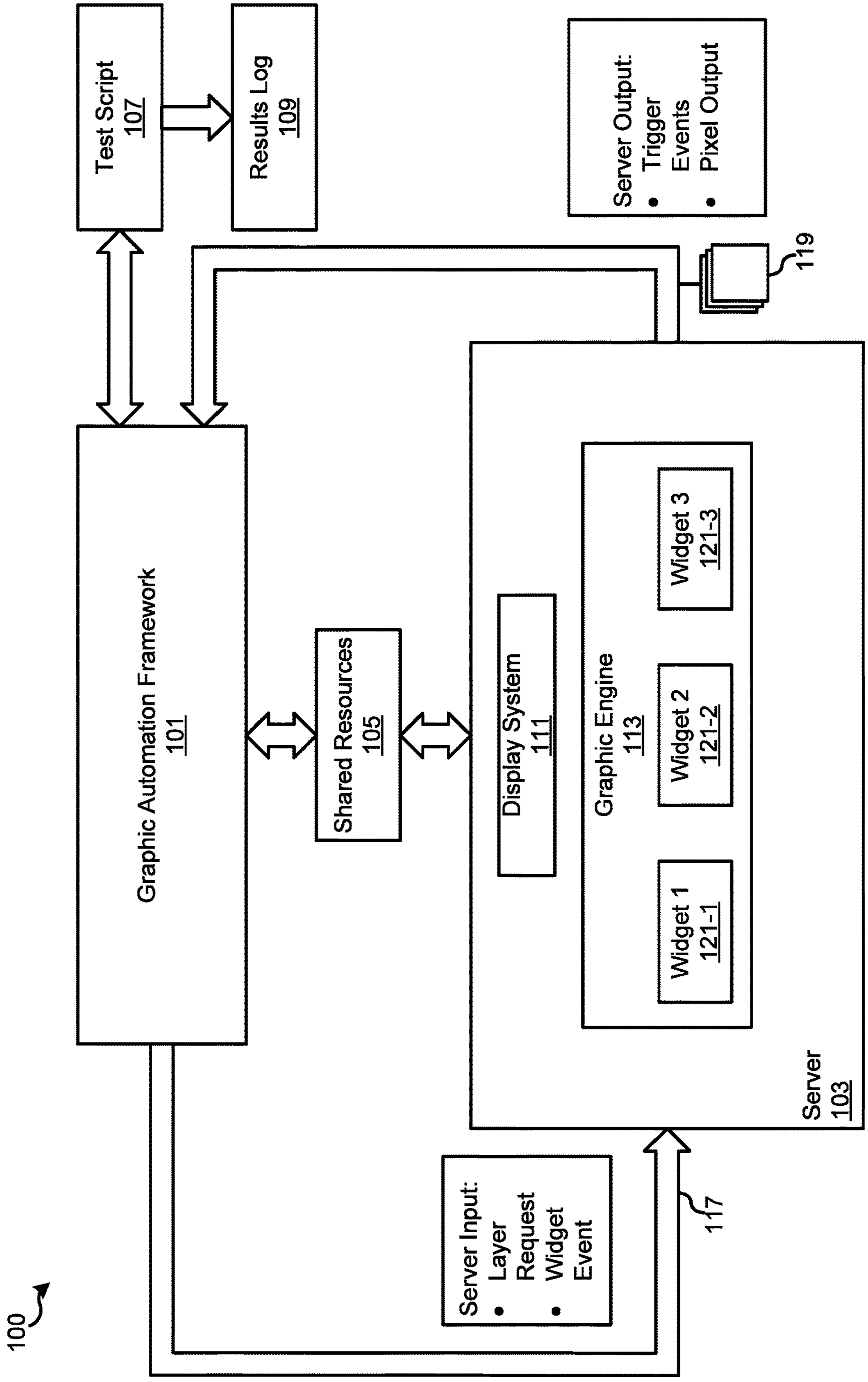
FIG. 1 is a diagram illustrating an exemplary conventional verification method for graphic objects.

Per common practice, the drawings do not show the various described features according to scale. Rather, the drawings depict features to emphasize the relevance of the depicted features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and methods for automatically verifying static and dynamic graphic objects are described herein. In some systems, a graphic engine prepares content to be rendered on a physical display via a graphic processor. During preparation, the graphic engine may indicate when certain triggering events occur. The triggering events may indicate that the graphic engine has finished preparing the content of a graphic object. Alternatively, the triggering event may indicate that the graphic engine has refreshed already prepared content. The triggering event may also indicate that a user has performed an action defined within the graphic object. When a triggering event arises, data describing the graphic object is copied from a frame buffer to a test buffer. Additionally, a value may be calculated for the copied graphic object. The system then overlays the copied graphic object with the calculated value. The system may then compare the copied graphic object with an expected graphic object. The system can verify that graphic objects are rendered correctly by comparing the copied graphic object to the expected graphic object. Further, additional types of information can be overlaid on the graphic object. For example, the additional types of information may include the time when the graphic object was rendered, the input method used to view the image (i.e. speech, keypad, mouse, touch display, etc.), current aircraft position, or other data that can help testers verify the correct rendering of graphic objects.

In some system applications, software must be certified before deployment. Often, software certification depends on satisfying defined software certification guidelines. For example, RTCA-DO-178B/C defines guidelines for developing and certifying safety-critical software in airborne systems and equipment. As part of many certification standards, guidelines call for requirements-based testing objectives that the software must satisfy. The software verification process often defines test cases and procedures for the software requirements, along with bi-directional traceability between the requirements and test cases, test cases and procedures, and procedures and results.

It is common for a test engineer (or another qualified individual) to visually examine graphic objects produced by a graphic engine to validate their conformance to the expected graphic objects specified in the test procedures. While verifying, the test engineer typically needs to examine multiple aspects of the rendered graphic objects carefully. As an illustration, when a graphic engine renders a graphic object for the first time, the task of the test engineer is to ensure the precise rendering of the object or widget per the design specifications and defined requirements. Additionally, when a graphic engine dynamically updates a graphic object or, if dynamically received data changes information presented in the graphic object, the test engineer must verify that the graphic object accurately represents the changes. Further, rendered graphic objects may include components that change in response to user interactions. The test engineer must verify the correct rendering of any changes to a graphic object triggered by user interactions.

When verifying a graphic object, a test engineer must verify multiple characteristics of the graphic object to ensure that the graphic object is accurately rendered. For example, a graphic object may have multiple components and behaviors, which must be verified individually. For each component in the graphic object, the test engineer verifies multiple attributes that include the color of the component, the fonts of any rendered text, the orientation of the component, the size of the component, and the like. The test engineer must also verify that the various components are appropriately aligned and justified with respect to one another.

The typical verification process is subject to multiple drawbacks. For example, the rendered graphic objects must be verified from the beginning of software execution. Thus, errors and correct rendering must be checked from the beginning of execution. Another drawback arises from the personal capabilities of the individual verifying the software. For example, not all test engineers may be able to verify the correct rendering of graphic objects in such a way that satisfies certification standards. Additionally, as the graphic objects may change dynamically, the manual analysis of the dynamic changes is prone to errors and is a general concern with the certification process.

The present disclosure discloses systems and methods that address the concerns discussed above that arise during the typical verification process. Systems and methods described herein verify the rendering of graphic objects by automatically capturing objects from simulated environments and actual targets. Further, systems and methods perform offline analysis of the rendered graphic objects against the expected content/behavior of the graphic objects. Also, the verification process described herein verifies dynamically changing graphic objects accurately. Additionally, as the systems do not rely on visual inspection by a test engineer, the verification may be performed at any time, enabling more efficient use of resources. Further, the systems and methods described herein may be deployed remotely and applied to multiple display systems. For example, the verification process described herein may be applied to cockpit display systems, augmented reality displays, virtual reality display systems, or other systems that have rendered graphic objects.

FIG. 1 is a block diagram of a system 100 for automated verification of static and dynamic graphic objects for rendering within a display system 111. The display system 111 may be a cockpit display system, an augmented reality display, a virtual reality display system, a resistive or capacitive touch display, or other display systems. As shown, the software for the display system 111 may be executed on a server 103, or a display system 111 may be connected to the server 103. While the server 103 is described as a server, the server 103 may refer to any computational device capable of performing the functionalities described as being performed by the server 103. The server 103 may include a graphic engine 113 that renders multiple components for display on the display system 111. For example, the graphic engine 113 may render multiple widgets 121-1-221-3 for display on the display system 111.

In certain embodiments, the server 103 may provide a server output 119. The server output 119 may include the data that can be displayed as rendered graphic objects. For example, the data may include information representing what should be displayed for a particular pixel on the display system 111. Additionally, the server output 119 may include various notifications responding to various triggering events. When triggered, the server 103 may output a notification that indicates that a layer has experienced a change or a particular component has experienced a change. For example, if one of the widgets 121-1-221-3 experiences a change, the server 103 may indicate the change within the server output 119.

In further embodiments, the system 100 includes a graphic automation framework 101 that receives the server output 119 for performance of the verification of the rendered graphic objects received from the graphic engine 113. The graphic automation framework 101 receives the server output 119 and a test script 107. As used herein, the test script 107 provides instructions to the graphic automation framework 101 for comparing the server output 119 to verify the correct rendering of graphic objects. In some implementations, the test script 107 provides a script that allows tracing the rendered graphic objects to the defined requirements. Thus, the graphic automation framework 101 uses the test script 107 to compare the server output 119 against an expected result for the rendered graphics, like the widgets 121-1-121-3. The graphic automation framework 101 then saves the results of the tests in a results log 109.

In additional embodiments, the graphic automation framework 101 may provide control instructions 117 to the server 103. The control instructions 117 are a series of instructions that direct the server 103 to provide specific data within the server output 119 to the graphic automation framework 101. For example, the control instructions 117 may include requests for particular layers of rendered graphic information from the server 103. Also, the control instructions 117 may direct the server 103 to generate various widget events. The control instructions 117 may be generated by the graphic automation framework 101 because of data in the test script 107. Alternatively, the control instructions 117 may be generated in response to tests performed on the server output 119.

In additional embodiments, the graphic automation framework 101 may be performed on shared resources 105. The shared resources 105 may be computational resources used by the graphic automation framework 101 and the server 103 to perform the functions described above. While the shared resources 105 may be used by both the graphic automation framework 101 and the server 103, the graphic automation framework 101 and server 103 may use different computational resources that communicate with one another.

In exemplary embodiments, the shared resources 105 may include one or more processors that can execute instructions that control the performance of the verification of static and dynamic graphic objects. A processor may be a computational device (such as a general-purpose processor, multi-core processor, multiple processors, dedicated circuitry, and the like). The functions performed by the processor may be implemented using software, firmware, hardware, or any appropriate combination thereof. The processor and other computational devices may be supplemented by, or incorporated in, specially-designed application-specific integrated circuits (ASICs) or field programmable gate arrays (FPGAs). The processor and other computational devices can also include or function with software programs, firmware, or other computer-readable instructions for performing various process tasks, calculations, and control functions used in the present methods and systems.

The present methods may be implemented by computer-executable instructions, such as program modules or components executed by the processor or other computational devices. Generally, program modules include routines, programs, objects, data components, data structures, algorithms, and the like, which perform particular tasks or implement particular abstract data types.

The memory may be any suitable computer-readable storage media that includes, for example, non-volatile memory devices, including semiconductor memory devices such as random access memory (RAM), read-only memory (ROM), electrically erasable programmable ROM (EEPROM), or flash memory devices; magnetic disks such as internal hard disks or removable disks; optical storage devices such as compact discs (CDs), digital versatile discs (DVDs), Blu-ray discs, or other media that can carry or store desired program code as computer-executable instructions or data structures.

As the graphic automation framework 101 can compare rendered objects and their performance to expected outputs, many of the challenges presented by visual inspection by test engineers are avoided. Accordingly, the system 100 is able to more efficiently and accurately certify the performance of static and dynamic graphic objects.

Figure 2:
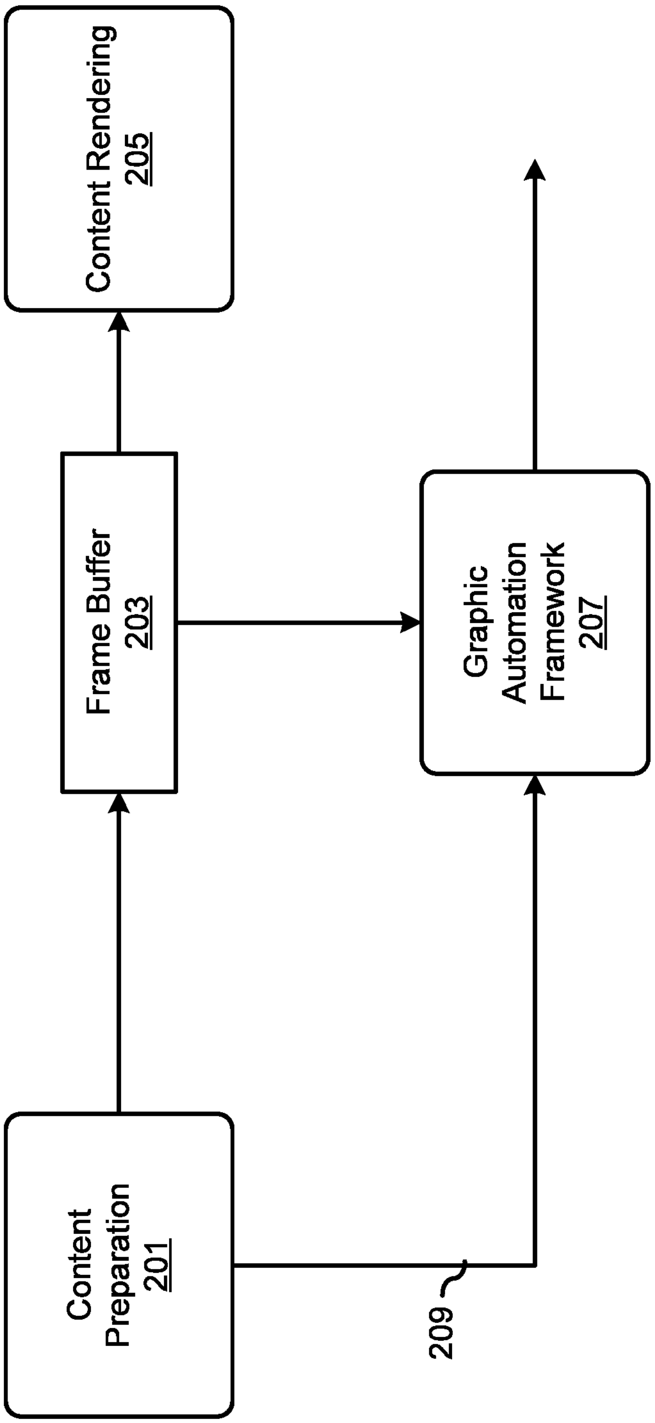
FIG. 2 is a functional block diagram of a system for verification of graphic objects according to an aspect of the present disclosure.

FIG. 2 is a block diagram showing the functions performed by the system 100 when performing verification of static and dynamic graphic objects. For example, the system 100 may include several functions performed by the server 103 and the graphic automation framework 101. In particular, the server 103 may perform content preparation 201, and the prepared content may be saved in a frame buffer 203. The data in the frame buffer 203 may be provided to a graphics processor, which renders the data in the frame buffer 203 for display on a display system as part of performing the content rendering 205. The content rendering 205 may be part of rendering the prepared data from the content preparation 201 on the display system 111.

In addition to performing the content rendering 205, where the data in the frame buffer 203 is rendered on the display system 111, the data stored in the frame buffer 203 may also be provided to the graphic automation framework 207, similar to the graphic automation framework 101. In addition to preparing the data for rendering, the content preparation 201 may generate triggers 209 that provide data to the graphic automation framework 207. The triggers 209 instruct the graphic automation framework 207 to copy the frame buffer data to a test buffer, where the frame buffer data can be analyzed by the same or another processor.

In certain embodiments, the content preparation 201 may generate triggers 209 to indicate when the preparation of the content is completed. For example, when the content preparation 201 performs the initial content preparation and saves the content in the frame buffer 203, the content preparation 201 sends a trigger 209 to the graphic automation framework 207 to indicate that data has been stored in the frame buffer. Additionally, the content preparation 201 may generate triggers when the prepared content is refreshed. For example, when the content preparation 201 refreshes data stored in the frame buffer 203, the content preparation 201 sends a trigger 209 to the graphic automation framework 207 to indicate that the data stored in the frame buffer has been refreshed. Also, the content preparation 201 may generate triggers 209 in response to user-performed selections and/or actions performed in a window. For example, when the content preparation 201 determines that data in the frame buffer has changed in response to user interaction, the content preparation 201 sends a trigger 209 to indicate that the data in the frame buffer has changed. Examples of potential user interactions may include eye gaze control, speech, touch, gesture, cursor control devices, keyboards, buttons, and knobs.

In certain implementations, when the graphic automation framework 207 receives a trigger 209 that indicates that the content has been prepared, the graphic automation framework 207 initiates a copy of the data in the frame buffer 203 to a test buffer. Additionally, when the graphic automation framework 207 receives a trigger 209 that indicates that the content has been refreshed, the graphic automation framework 207 also initiates a copy of the data in the frame buffer 203 to a test buffer. Further, when the graphic automation framework 207 receives a trigger 209 that indicates user interaction has changed the data in the frame buffer 203, the graphic automation framework 207 initiates a copy of the data in the frame buffer 203 to a test buffer. Also, as user interactions can update or refresh the already displayed window, capturing the content on a user-initiated command serves as another trigger 209 for comparing the graphics rendered on a display device by the content rendering 205. When the graphic automation framework 207 copies data into the test buffer in response to receiving one of the triggers described above, the graphic automation framework 207 provides the test buffer for further processing and analysis. Further, the graphic automation framework 207 may also mark the data in the test buffer with a counter value or a timestamp to help identify the frame.

Figure 3:
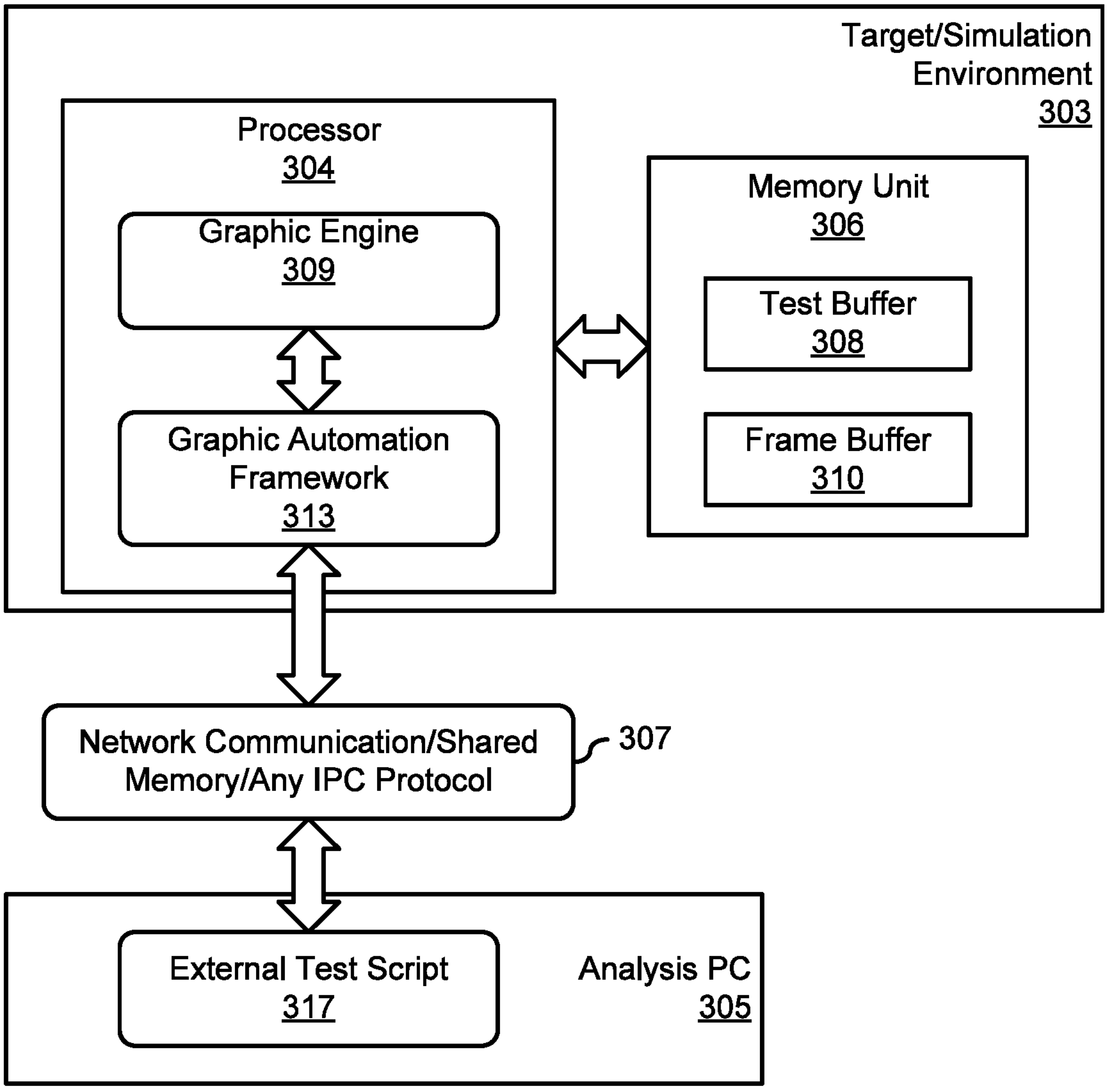
FIG. 3 is a block diagram illustrating networked devices employed in the verification of graphic objects according to an aspect of the present disclosure.

FIG. 3 is a block diagram illustrating the interaction of the system 100, represented as target/simulation environment 303 in communication with an analysis PC 305. As illustrated, the simulation environment 303 may include a processor 304 and a memory unit 306. The processor 304 may execute instructions associated with the functionality of a graphic engine 309 and a graphic automation framework 313. The memory unit 306 may provide memory for storing executable instructions and memory associated with buffers for storing image data, such as a test buffer 308 and frame buffer 310.

In certain embodiments, the graphic engine 309 and the graphic automation framework 313 may function similarly to the graphic engine 113 and the graphic automation framework 101 and 207 described above. In particular, the graphic automation framework 313 within the simulation environment 303 may read the pixels for a rendered image, store the data in the test buffer 308, and provide the test buffer 308 to the analysis PC 305. Alternatively, the graphic automation framework 313 may copy pixel data in the frame buffer 310 into the test buffer 308 for transmission to the analysis PC 305. Also, the graphic automation framework 313 may affix identification information to the test buffer 308 (such as a counter value or timestamp) that can be used to uniquely identify the frame in the test buffer 308. For example, the simulation environment 303 may communicate with the analysis PC 305 through a network connection that uses a communication protocol 307, like the IPC protocol. Alternatively, the simulation environment 303 and the analysis PC 305 may share a memory device, where the simulation environment 303 stores the test buffer 308 on the shared memory device, and the test buffer 308 is retrieved by the analysis PC 305, such as the test buffer 308.

In certain embodiments, when the simulation environment 303 has transmitted the data in the test buffer 308 to the analysis PC 305 through the communication protocol 307 or through a shared memory, the analysis PC 305 may construct an image from the pixel data. Also, the analysis PC 305 may identify the test information associated with the frame based on the identification information affixed to the frame in the received test buffer 308. When the analysis PC 305 constructs the image, the analysis PC 305 may execute an external test script 317. The external test script can then analyze the data in the test buffer 308 to ensure that the rendered data received from the target/simulation environment appears as expected. Accordingly, the analysis PC 305 is able to perform an offline analysis of the rendered images.

Figure 4:
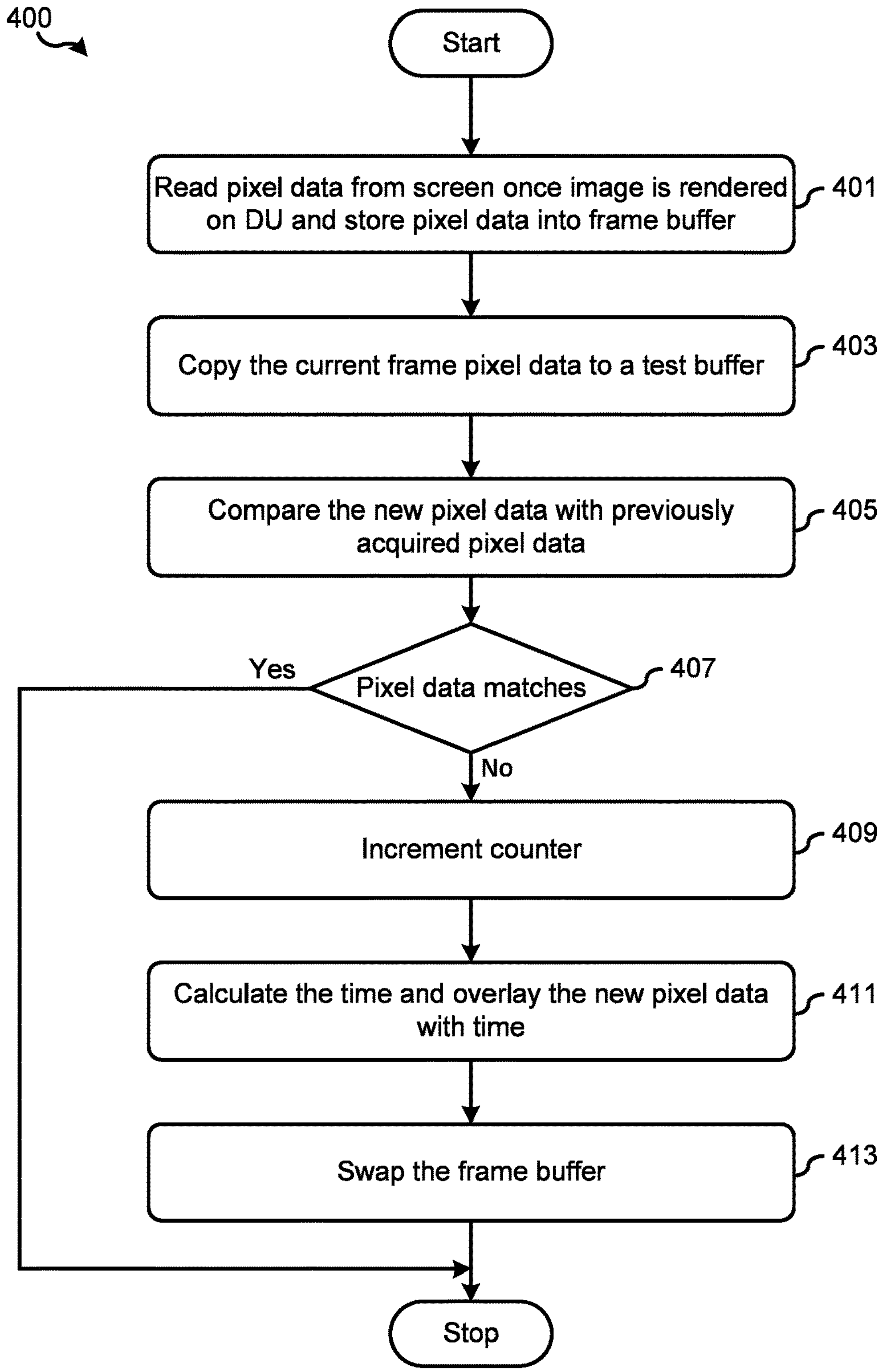
FIG. 4 is a flowchart diagram of a method for verifying graphic objects according to an aspect of the present disclosure.

FIG. 4 is a flowchart of a method 400 for automatically verifying graphic objects. The method 400 may be performed by the system 100. In particular, the method 400 may be performed by the graphic automation framework 101 and the graphic engine 113. As shown, the method 400 proceeds at 401, where pixel data is read from a screen once the image is rendered on a display unit. Further, the read pixel data is stored in a frame buffer. For example, the graphic engine 113 may prepare pixel data for display on the display system 111 and store the pixel data in the frame buffer 203. In some implementations, after the image is rendered on the display unit, the server 103 can read the pixel data by selecting each pixel on the display and identifying the RGB value and x-y coordinates associated with the selected pixels. Other classifiers may be used to identify the appearance of each pixel. When data has been stored into the frame buffer, the method 400 proceeds at 403, where the current frame pixel data is copied into a test buffer.

In certain embodiments, when the pixel data for the current frame has been copied into a test buffer, the method 400 proceeds at 405, where the most recent pixel data is compared with previously acquired pixel data that is saved in a previously acquired data buffer. For example, the recently acquired pixel data may represent the most recent image rendered on the display unit, and the previously acquired pixel data may represent data rendered on the display unit at a time before the new pixel data was captured. Based on the comparison, the method 400 proceeds at 407, where it is determined whether the new pixel data matches the previously acquired pixel data. If the new pixel data matches the previously acquired pixel data, the new pixel data is discarded because it is not unique from the previously acquired pixel data, which has already been verified. Alternatively, if the new pixel data does not match the previously acquired pixel data, it is determined that the new pixel data represents a newly rendered image or graphic object to be verified. In an alternative implementation, instead of determining whether the pixel data matches, the system may determine whether the data was captured in response to a particular event. Thus, the new pixel data may represent data to be verified based on the occurrence of the particular event.

In some embodiments, when it is determined that the new pixel data represents a new rendered image to be verified, the method 400 proceeds at 409, where a counter is incremented. When the counter is incremented, the resultant value of the counter may be associated with the new pixel data. The associated count value may be overlayed on the new pixel data or provided with the new pixel data when the new pixel data is verified against the expected pixel data. For example, the graphic engine may maintain a counter that is incremented whenever a new frame for verification is identified. The graphic engine may then overlay the counter on the new pixel data. Alternatively, the graphic engine may store the counter in the test buffer with the new pixel data.

In a further embodiment, when it is determined that the new pixel data represents a new rendered image or that the new pixel data should be verified for another reason, the method 400 proceeds at 411, where a timing value is calculated and overlayed on the new pixel data. For example, if a first frame is drawn at a first time, a timestamp representing the first time may be overlayed on the first frame. The next frame may be rendered at a second time equal to the first time plus a delta time, which is also overlayed on the next frame. In some implementations, the timing value may be retrieved from a system clock. Alternatively, the timing value may be calculated based on the incremented counter. For example, the timing value may be equal to a the incremented counter multiplied by a defined rate. The defined rate may be a refresh rate for the display unit, a system clock, or other defined rate. The calculated timing value may then be associated with the pixel data. Accordingly, the timestamp information found on the different frames can be used to identify the rendering time of any incorrect frames. In a particular example, the graphics engine may dynamically refresh a series of ten frames that each have an overlying timestamp, where each frame was refreshed at a particular refresh rate. The overlying timestamps can be used by an analysis PC 305 (or other device) to separate the refreshed frames from one another. Also, in some cases, the timestamps can be placed at locations on the rendered frame to prevent the timestamps from interfering with the rendered graphics.

In some embodiments, other data may overlay the graphic object in place of or in addition to the overlain timestamp. For example, additional types of information may include the time when the graphic object was rendered, the input method used to view the image (i.e. speech, keypad, mouse, touch display, etc.), current aircraft position, or other data that can help testers verify the correct rendering of graphic objects.

In certain embodiments, after the counter value has been inserted into the pixel data, the method 400 may proceed at 413, where the frame buffer is swapped. For example, after applying the time (or other value) to the new pixel data that is saved in the test buffer, the new pixel data stored in the test buffer may be swapped into the previously acquired data buffer in preparation for the reception of additional pixel data from yet to be generated graphic objects. Thus, the new pixel data may be stored as the previously acquired pixel data for subsequent comparisons performed at 407.

Figure 5:
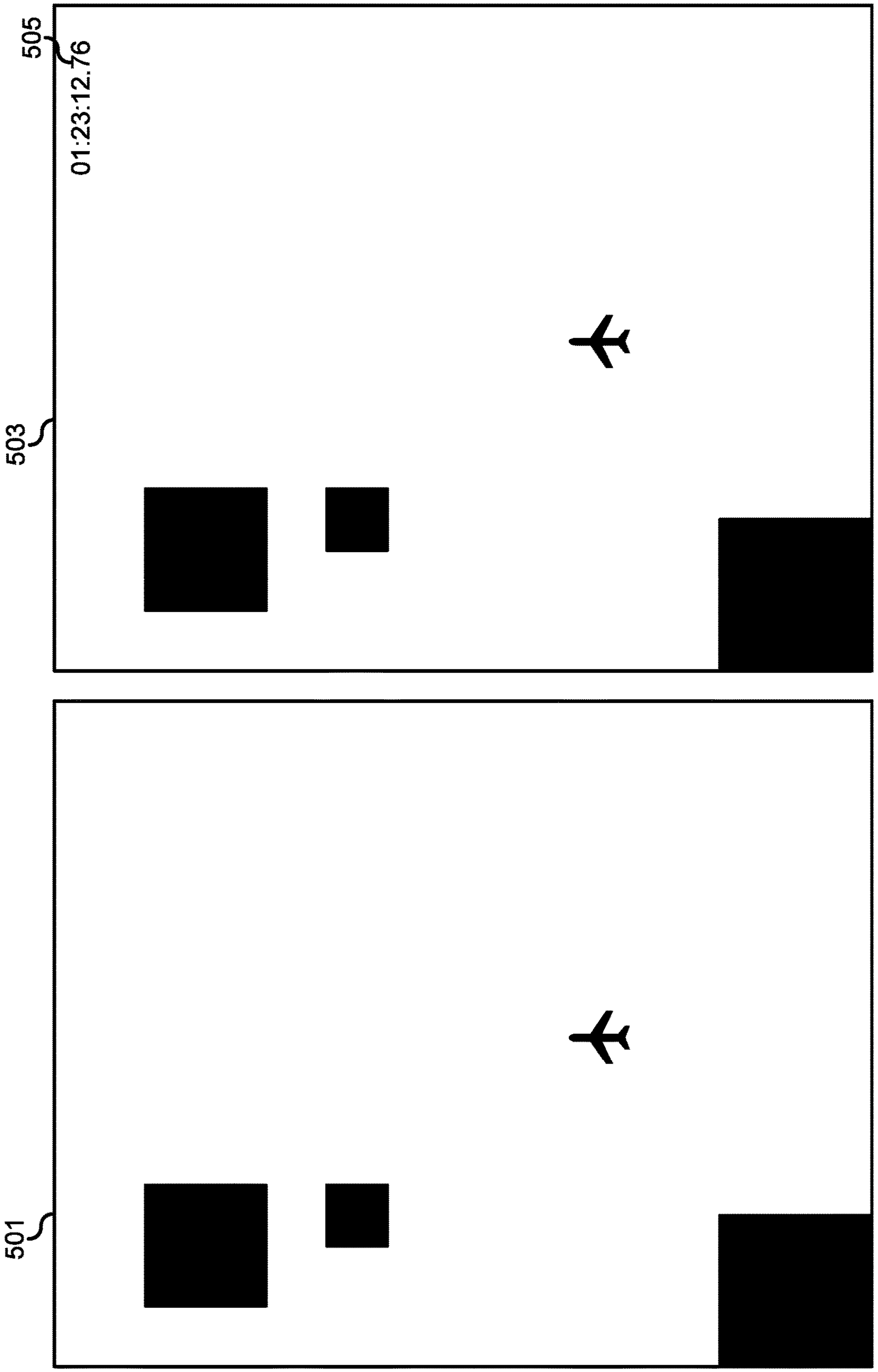
FIG. 5 is a diagram illustrating the overlaying of a graphic object with a timing value according to an aspect of the present disclosure.

FIG. 5 is a diagram illustrating rendered image data 501 that was rendered by a graphic engine and overlain image data 503, where a value 505 has been overlayed on the rendered image data 501. As shown, the value 505 may be a timing value. Alternatively, the value 505 may be a counter value. As shown, the value 505 may be placed on the rendered image data 501 at a location so as to not interfere with other rendered objects contained within the overlain image data 503.

Figure 6:
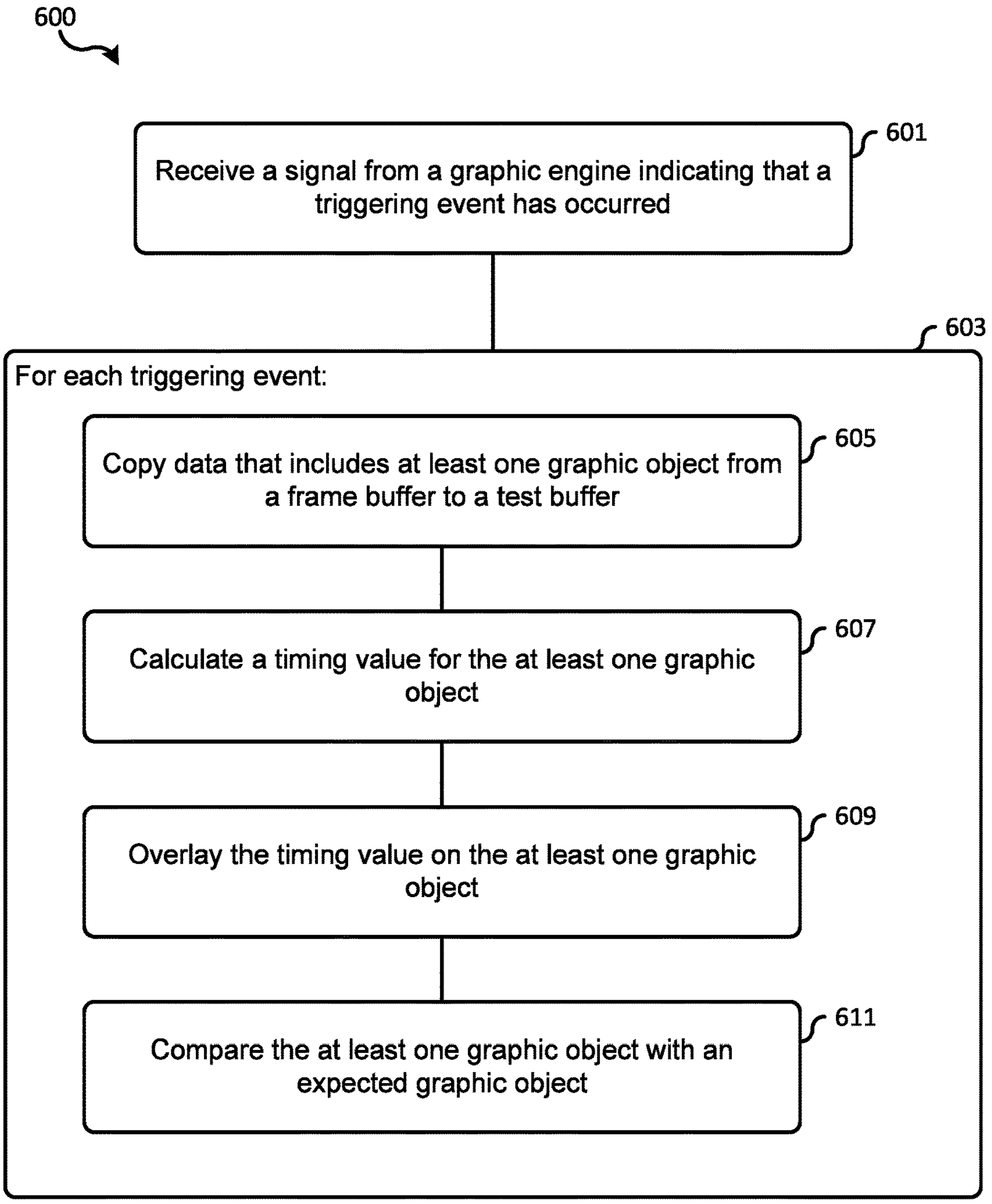
FIG. 6 is a flowchart diagram of a method for verifying graphic objects according to an aspect of the present disclosure.

FIG. 6 is a flowchart diagram of a method 600 for performing automatic verification of static and dynamic graphic objects rendered by a graphic engine. The method 600 proceeds at 601, where a signal is received from a graphic engine that indicates that a triggering event has occurred. The method 600 then proceeds at 603, where multiple features are performed for each triggering event.

In certain implementation, for each triggering event, the method 600 then proceeds at 605, where data that includes at least one graphic object is copied from a frame buffer to a test buffer. Further, the method 600 then proceeds at 607, where a timing value is calculated for the at least one graphic object. Moreover, the method 600 then proceeds at 609, where the timing value is overlaid on the at least one graphic object. Additionally, the method 600 then proceeds at 611, where the at least one graphic object is compared with an expected graphic object.

EXAMPLE EMBODIMENTS

Example 1 includes a method for automatic verification of static and dynamic graphic objects rendered by a graphic engine, the method comprising: receiving a signal from the graphic engine indicating that a triggering event has occurred; and for each triggering event: copying data that includes at least one graphic object from a frame buffer to a test buffer; calculating a timing value for the at least one graphic object; overlaying the timing value on the at least one graphic object; and comparing the at least one graphic object with an expected graphic object.

Example 2 includes the method of Example 1, wherein the triggering event indicates at least one of: preparation of the at least one graphic object by the graphic engine; a refresh of the at least one graphic object by the graphic engine; and interaction of a user with the at least one graphic object.

Example 3 includes the method of any of Examples 1-2, wherein calculating the timing value comprises: incrementing a counter; and multiplying the counter by a rate.

Example 4 includes the method of any of Examples 1-3, wherein comparing the at least one graphic object with the expected graphic object comprises saving the data in the test buffer for offline analysis.

Example 5 includes the method of any of Examples 1-4, wherein comparing the at least one graphic object with the expected graphic object comprises transmitting the at least one graphic object to another computing device.

Example 6 includes the method of any of Examples 1-5, wherein copying the data comprises comparing pixel data of the at least one graphic object against previously acquired pixel data to determine whether the at least one graphic object is new.

Example 7 includes the method of Example 6, further comprising swapping the previously acquired pixel data with the pixel data when the at least one graphic object is new.

Example 8 includes the method of any of Examples 1-7, wherein copying the data comprises reading pixel data for pixels displayed on a display unit.

Example 9 includes a system comprising: a display system; one or more memory units configured to store one or more buffers for storing information that can be rendered as graphic objects; and one or more processors configured to execute computer instructions that implement: a graphic engine configured to generate one or more graphic objects on the display system; and a graphic automation framework configured to respond to triggering events by: copying data describing at least one graphic object in the one or more graphic objects from a frame buffer in the one or more buffers into a test buffer in the one or more buffers; determine a timing value for the at least one graphic object; associating the timing value with the at least one graphic object; and compare the at least one graphic object with an expected graphic object.

Example 10 includes the system of Example 9, wherein the triggering events indicate at least one of: preparation of the at least one graphic object by the graphic engine; a refresh of the at least one graphic object by the graphic engine; and interaction of a user with the at least one graphic object, wherein the interaction of the user with the at least one graphic object is through at least one of eye gaze control, speech, touch, gesture, cursor control device, keyboard, and knobs.

Example 11 includes the system of any of Examples 9-10, wherein the graphic automation framework is configured to determine the timing value by incrementing a counter and multiplying the counter by a rate.

Example 12 includes the system of any of Examples 9-11, wherein the graphic automation framework is configured to compare the at least one graphic object by saving the data in the test buffer for offline analysis.

Example 13 includes the system of any of Examples 9-12, wherein the graphic engine and the graphic automation framework are configured to share at least one processor in the one or more processors and at least one memory unit in the one or more memory units.

Example 14 includes the system of any of Examples 9-13, wherein the graphic automation framework is configured to transmit the data describing the at least one graphic object to another computing device.

Example 15 includes the system of any of Examples 9-14, wherein the graphic automation framework is configured to copy the data describing the at least one graphic object when pixel data associated with the at least one graphic object is different from previously acquired pixel data for previously rendered graphic objects.

Example 16 includes the system of Example 15, wherein the graphic automation framework is further configured to swap the previously acquired pixel data with the pixel data associated with the at least one graphic object.

Example 17 includes the system of any of Examples 9-16, wherein the display system consists of resistive or capacitive touch interface configured to receive at least one of touch and gestures from a user.

Example 18 includes a system comprising: a server configured to implement a graphic engine configured to generate one or more graphic objects on a display unit; and a graphic automation framework is configured to receive the one or more graphic objects generated by the graphic engine and respond to triggering events by: copying data describing at least one graphic object in the one or more graphic objects from a frame buffer into a test buffer; determine a counter value for the at least one graphic object; associate the counter value on the at least one graphic object; and compare the at least one graphic object with an expected graphic object.

Example 19 includes the system of Example 18, wherein the server communicates with a different computation device that executes the graphic automation framework, wherein the different computation device and the server share at least one computational resource.

Example 20 includes the system of any of Examples 18-19, wherein the graphic automation framework is configured to compare the at least one graphic object with the expected graphic object as directed by a test script.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for automatic verification of static and dynamic graphic objects rendered by a graphic engine, the method comprising:

receiving a test script, wherein the test script provides instructions for verifying the correct rendering of graphic objects through tracing the graphic objects to defined requirements;

receiving a signal from the graphic engine indicating that a triggering event has occurred; and for each triggering event:

copying data that includes at least one graphic object from a frame buffer to a test buffer;

calculating a timing value for the at least one graphic object;

overlaying the timing value on the at least one graphic object; and comparing the at least one graphic object with an expected graphic object based on the test script.

2. The method of claim 1, wherein the triggering event indicates at least one of:

preparation of the at least one graphic object by the graphic engine;

a refresh of the at least one graphic object by the graphic engine; and interaction of a user with the at least one graphic object.

3. The method of claim 1, wherein calculating the timing value comprises:

incrementing a counter; and multiplying the counter by a rate.

4. The method of claim 1, wherein comparing the at least one graphic object with the expected graphic object comprises saving the data in the test buffer for offline analysis.

5. The method of claim 1, wherein comparing the at least one graphic object with the expected graphic object comprises transmitting the at least one graphic object to another computing device.

6. The method of claim 1, wherein copying the data comprises comparing pixel data of the at least one graphic object against previously acquired pixel data to determine whether the at least one graphic object is new.

7. The method of claim 6, further comprising swapping the previously acquired pixel data with the pixel data when the at least one graphic object is new.

8. The method of claim 1, wherein copying the data comprises reading pixel data for pixels displayed on a display unit.

9. A system comprising:

a display system;

one or more memory units configured to store one or more buffers for storing information that can be rendered as graphic objects; and one or more processors configured to execute computer instructions that implement:

a graphic engine configured to generate one or more graphic objects on the display system; and a graphic automation framework configured to respond to triggering events by:

copying data describing at least one graphic object in the one or more graphic objects from a frame buffer in the one or more buffers into a test buffer in the one or more buffers;

determine a timing value for the at least one graphic object;

associating the timing value with the at least one graphic object; and compare the at least one graphic object with an expected graphic object as directed by a test script, wherein the test script provides instructions for verifying the correct rendering of the one or more graphic objects through tracing the one or more graphic objects to defined requirements.

10. The system of claim 9, wherein the triggering events indicate at least one of:

preparation of the at least one graphic object by the graphic engine;

a refresh of the at least one graphic object by the graphic engine; and interaction of a user with the at least one graphic object, wherein the interaction of the user with the at least one graphic object is through at least one of eye gaze control, speech, touch, gesture, cursor control device, keyboard, and knobs.

11. The system of claim 9, wherein the graphic automation framework is configured to determine the timing value by incrementing a counter and multiplying the counter by a rate.

12. The system of claim 9, wherein the graphic automation framework is configured to compare the at least one graphic object by saving the data in the test buffer for offline analysis.

13. The system of claim 9, wherein the graphic engine and the graphic automation framework are configured to share at least one processor in the one or more processors and at least one memory unit in the one or more memory units.

14. The system of claim 9, wherein the graphic automation framework is configured to transmit the data describing the at least one graphic object to another computing device.

15. The system of claim 9, wherein the graphic automation framework is configured to copy the data describing the at least one graphic object when pixel data associated with the at least one graphic object is different from previously acquired pixel data for previously rendered graphic objects.

16. The system of claim 15, wherein the graphic automation framework is further configured to swap the previously acquired pixel data with the pixel data associated with the at least one graphic object.

17. The system of claim 9, wherein the display system consists of resistive or capacitive touch interface configured to receive at least one of touch and gestures from a user.

18. A system comprising:

a server configured to implement a graphic engine configured to generate one or more graphic objects on a display unit; and a graphic automation framework is configured to receive the one or more graphic objects generated by the graphic engine and respond to triggering events by:

copying data describing at least one graphic object in the one or more graphic objects from a frame buffer into a test buffer;

determine a counter value for the at least one graphic object;

associate the counter value on the at least one graphic object; and compare the at least one graphic object with an expected graphic object as directed by a test script, wherein the test script provides instructions for verifying the correct rendering of the one or more graphic objects through tracing the one or more graphic objects to defined requirements.

19. The system of claim 18, wherein the server communicates with a different computation device that executes the graphic automation framework, wherein the different computation device and the server share at least one computational resource.

* * * * *